3,057,882
PROCESS FOR THE PRODUCTION OF BIS-(p-HYDROXYARYL)-ARYL-ACETONITRILES

Hermann Schnell, Krefeld-Urdingen, and Gustav Büchwald, Krefeld-Bockum, Germany, assignors to Farbenfabriken Bayer Aktiengesellschaft, Leverkusen, Germany, a corporation of Germany
No Drawing. Filed Apr. 21, 1959, Ser. No. 807,755
Claims priority, application Germany Apr. 23, 1958
9 Claims. (Cl. 260—395)

This invention is concerned with a process for the production of bis-(p-hydroxylaryl)-aryl acetonitriles, which may also be designated bis(p-hydroxyaryl)arylcyanomethanes.

Bis-(p-hydroxyphenyl)-phenyl-acetonitrile was previously produced but by the reaction of benzoyl cyanide with a phenol ether in the presence of aluminum chloride in carbon disulphide to give a bis-(p-alkoxyphenyl)-phenyl acetonitrile and splitting off the alkoxy group, and by the reaction of benzaurine with potassium cyanide. Both methods are not very suitable for technical production of the nitriles.

We have now found that bis-(p-hydroxyaryl)-aryl acetonitriles can be produced in a technically simple and advantageous manner by the condensation of about 1 mol of an aroyl cyanide with about 2 mols of aromatic hydroxy compound in an acidic medium. A saponification of the aroyl cyanide or of an acylation of the aromatic hydroxy compounds is, surprisingly, substantially suppressed.

As aroyl cyanides there can be used for the process according to the present invention all aroyl cyanides known in the art, particularly benzoyl cyanide, as well as substituted benzoyl cyanides, such as p-chlorobenzoyl cyanide, 2,4-dichlorobenzoyl cyanide, p-methyl-benzoyl cyanide, p-methoxybenzoyl cyanide, p-nitrobenzoyl cyanide, and 2,4-dinitrobenzoyl cyanide. Furthermore, cyanides of diphenyl monocarboxylic and dicarboxylic acids having the formulae C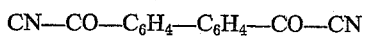$_6$H$_5$—C$_6$H$_4$—CO—CN and $$CN—CO—C_6H_4—C_6H_4—CO—CN$$

as well as cyanides of naphthoic and anthracenecarboxylic and phenanthrenecarboxylic acids, may likewise be used.

As aromatic hydroxy compounds there can be used, e.g., phenol, substituted phenols, such as the cresols, the chlorophenols, the nitrophenols, and the hydroxydiphenyls, dihydric phenols such as resorcinol, the dihydroxydiphenyls, the dihydroxydiphenyl-alkanes, ethers, sulfides, sulphones and sulphoxides, and hydroxyphenyl ethers, such as anisole, and naphthols.

Thus, one can produce, for example, bis-(p-hydroxyphenyl)-phenyl acetonitrile (melting point 202° C.) from benzoyl cyanide, bis-(p-hydroxyphenyl)-p-chlorophenyl acetonitrile (melting point 229–233° C.) from p-chlorobenzoyl cyanide, bis(p-hydroxyphenyl)-2,4-dichlorophenyl acetonitrile (melting point 272–276° C.) from 2,4-dichlorobenzoyl cyanide, bis-(p-hydroxyphenyl)-p-methylphenyl acetonitrile (melting point 230–231° C.) from p-methylbenzoyl cyanide, bis-(p-hydroxyphenyl)-p-methoxyphenyl acetonitrile (melting point 193–196° C.) from p-methoxy-benzoyl cyanide and bis-(p-hydroxyphenyl)-p-nitrophenyl acetonitrile (melting point 216–220° C.) from p-nitrobenzoyl cyanide.

Suitable condensation agents are strong acids, such as sulphuric acid and hydrochloric acid.

If desired, there may be added as accelerators, ionizable organic sulphur compounds, for example, organic mercapto compounds, such as butyl mercaptan, dodecyl mercaptan and thioglycollic acid.

The reaction can be carried out with or without the addition of an inert solvent. Aliphatic and aromatic hydrocarbons, chlorinated hydrocarbons or organic acids, such as acetic acid, can serve as solvents.

The reaction temperature can lie between about −20° C. and about +60° C., and preferably between about 0° C. and about 40° C.

The new materials are suitable for preventing the aging of plastics. Thus, for instance, the tensile strength of films of polyvinyl chloride with a content of 33⅓ percent of trioctyl phosphate as plasticizer increases from 195 kg./cm.$^2$ to 209 kg./cm.$^2$, when 0.1 percent of bis-(p-hydroxyphenyl)-phenyl acetonitrile are added after treating the film at 170° C. for 45 minutes. Together, the elongation increases from 205 to 235 percent. Furthermore the bis-(p-hydroxyaryl)-aryl acetonitriles are suitable fungicides. In an artificial culture medium, *Lentinus squamosus* does not grow after the addition of 0.01 percent, *Polyporus vaporarius* after the addition of 0.01 to 0.1 percent, and *Coniophora cerebella* after the addition of 0.01 to 0.1 percent, for example, of bis-(p-hydroxyphenyl)-phenyl acetonitrile.

The following examples are given for the purpose of illustrating the invention, the parts being parts by weight.

Example 1

A mixture of 120 parts phenol, 60 parts benzoyl cyanide and 1.5 parts dodecyl mercaptan is cooled to 15° C.; 30 parts concentrated sulphuric acid are added dropwise with stirring within a period of one hour. The reaction mixture is subsequently stirred for four hours at 15° C. The crude product is stirred for two hours with 200 parts water and 40 parts methylene chloride. The precipitated crystals are filtered off with suction and washed until neutral. Yield: 130 parts (94 percent of theory of bis-(p-hydroxyphenyl)-phenyl acetonitrile (melting point 202° C.).

Phenolic OH No.: calculated 11.3, found 11.2.

Example 2

A mixture of 405 parts phenol, 312 parts p-chlorobenzoyl cyanide and 4 parts thioglycollic acid is cooled to 14° C. 100 parts concentrated sulphuric acid are added dropwise with stirring at this temperature. The reaction mixture is allowed to stand for 20 hours at 20° C. and subsequently worked up as in Example 1. Yield: 481 parts (75.7 percent of theory) of bis-(p-hydroxyphenyl)-p-chlorophenylacetonitrile (melting point 229–233° C.).

Phenolic OH No.: calculated 10.1, found 9.7.

Example 3

A mixture of 410 parts phenol, 304 parts p-methoxybenzoyl cyanide and 3.5 parts thioglycollic acid is cooled to 15° C. 90 parts concentrated sulphuric acid are added dropwise within a period of one hour. The reaction mixture is subsequently stirred for six hours and, after 40 hours, worked up as in Example 1. The initially greasy precipitate is dissolved in a sodium hydroxide solution and precipitated with dilute hydrochloric acid. After 10 hours it is filtered off with suction and washed with water until neutral. Yield: 280 parts (45 percent of theory) of bis-(p-hydroxyphenyl)-p-methoxyphenyl acetonitrile (melting point 193–196° C.).

Phenolic OH No.: calculated 10.25, found 10.0.

Example 4

A mixture of 143 parts o-cresol, 65.5 parts benzoyl cyanide and 1.5 parts thioglycollic acid is cooled to 15° C. Then 32 parts concentrated sulphuric acid are added dropwise within a period of 40 minutes. After 12 hours the mixture is solidified to a hard mass. It is dissolved in diluted caustic soda solution. The reaction product is precipitated therefrom by adding diluted hydrochloric acid. The greasy product is then dissolved in methylene chloride. After standing for 24 hours at 0° C. 122 parts (74 percent of theory) of bis-(2-methyl-4-hydroxyphenyl)-phenyl acetonitrile as white crystals have precipitated.

Phenolic OH No.: calculated 10.3, found 10.3–10.5. Melting point: 130–140° C.

Example 5

A mixture of 143 parts m-cresol, 65.5 parts benzoyl cyanide and 1.5 parts thioglycollic acid is cooled to 15° C. Then 32 parts concentrated sulphuric acid are added dropwise within a period of 30 minutes. After 12 hours the reaction mixture is solidified to a semi-hard mass. After working up according to Example 4 there are obtained 23 parts (14 percent of theory) of bis-(3-methyl-4-hydroxyphenyl)phenyl acetonitrile as white crystals.

Phenolic OH No.: calculated 10.3, found 10.4–10.5. Melting point: 228–236° C.

Example 6

To a mixture of 192 parts β-naphthol(2-naphthol), 65.5 parts benzoyl cyanide and 1.5 parts thioglycollic acid there are added dropwise 32 parts concentrated sulphuric acid at 20–30° C. within a period of 30 minutes. A solid black mass is obtained. After 12 hours it is dissolved in a mixture of methylene chloride and benzene. After standing for 24 hours at 0° C. white crystals have precipitated. Yield: 36 parts (18 percent of theory) of bis-(2-hydroxy-6-naphthyl)-phenylacetonitrile.

Phenolic OH No.: calculated 8.48, found 8.4. Melting point 215–220° C.

Example 7

A mixture of 144 parts anisole, 65.5 parts benzoyl cyanide and 1.5 parts thioglycollic acid is cooled to 15° C. Then 32 parts concentrated sulphuric acid are added dropwise within a period of 30 minutes. After 12 hours there are obtained two liquid phases. Methylene chloride is added, the organic phase separated and washed with water until neutral. After distilling off the methylene chloride the unreacted anisole is distilled off in vacuo. The residue is dissolved in ethanol. While cooling white crystals precipitate. Yield: 120 parts (73 percent of theory) of bis-(p-methoxyphenyl)-phenyl acetonitrile. Melting point: theoretical 98° C., found 94–96° C.

We claim:

1. A bis(hydroxyaryl)aryl acetonitrile having the following formula:

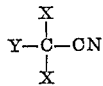

in which

X is a radical of the group consisting of 4-hydroxyphenyl, 2-methyl-4-hydroxyphenyl, 3-methyl-4-hydroxyphenyl, 4-methoxyphenyl, and 6-hydroxy-2-naphthyl, and Y is a radical of the group consisting of phenyl, 4-chlorophenyl, 2,4-dichlorophenyl, 4-methyl, 4-methoxy, 4-nitrophenyl, and 2,4-dinitrophenyl.

2. Bis-(p-hydroxyphenyl)-p-chlorophenyl acetonitrile.

3. Bis-(p-hydroxyphenyl)-2,4-dichlorophenyl acetonitrile.

4. Bis-(p-hydroxyphenyl)-p-methylphenyl acetonitrile.

5. Bis-(p-hydroxyphenyl) - p - methoxyphenyl acetonitrile.

6. A process for the production of bis(hydroxyaryl)-aryl acetonitrile of the group defined in claim 1, which comprises reacting (a) an aromatic compound of the group consisting of phenol, o-cresol, m-cresol, anisole, and 2-naphthol, together with (b) a benzoyl cyanide of the group consisting of benzoyl cyanide and 4-chlorphenyl, 2,4-dichlorophenyl, 4-methyl, 4-methoxy, 4-nitro, and 2,4-dinitro-substituted benzoyl cyanides, in the proportions of about 2 mols of the aromatic compound of group (a) to each mol of the benzoyl cyanide of group (b) in the presence of a strong mineral acid.

7. Process according to claim 6 wherein the reaction is carried out in the presence of a minor amount of an ionizable organic sulphur compound selected from the group consisting of butyl mercaptan, dodecyl mercaptan and thioglycollic acid.

8. Process according to claim 6, wherein the reaction is carried out at a temperature from about −20° C. to about +60° C.

9. Process according to claim 8, wherein the reaction is carried out at a temperature from about 0° C. to about 40° C.

References Cited in the file of this patent

UNITED STATES PATENTS

| | | |
|---|---|---|
| 2,535,014 | Johnson et al. | Dec. 19, 1950 |
| 2,734,088 | Knowles et al. | Feb. 7, 1956 |
| 2,894,004 | Dietzler | July 7, 1959 |